United States Patent [19]

Hill et al.

[11] 4,215,813

[45] Aug. 5, 1980

[54] EMBOSSED CHARACTER READER

[75] Inventors: James E. Hill, Prospect Heights; Baesley I. Dahlstrom, Des Plaines, both of Ill.

[73] Assignee: Dynetics Engineering Corp., Wheeling, Ill.

[21] Appl. No.: 907,959

[22] Filed: May 22, 1978

Related U.S. Application Data

[62] Division of Ser. No. 723,215, Sep. 14, 1976, Pat. No. 4,119,270.

[51] Int. Cl.$^2$ .................. G06K 7/04; G06K 13/06; B65H 3/52
[52] U.S. Cl. .................. 235/448; 235/475; 271/121
[58] Field of Search ............ 235/448, 475; 271/121, 271/124, 137, 165

[56] References Cited

U.S. PATENT DOCUMENTS

| | | | |
|---|---|---|---|
| 2,837,280 | 6/1958 | Baldwin | 235/475 |
| 3,714,398 | 1/1973 | Brock | 235/448 |
| 3,814,905 | 6/1974 | Lawrence et al. | 235/448 |
| 3,816,707 | 6/1974 | Kleinmeyer et al. | 235/448 |
| 3,825,727 | 7/1974 | Sarcia | 235/448 |
| 3,854,661 | 12/1974 | Weber et al. | 235/448 |

*Primary Examiner*—Daryl W. Cook
*Attorney, Agent, or Firm*—Dulin, Thienpont & Potthast Ltd.

[57] ABSTRACT

Device and method for reading indicia embossed, punched or impressed in a sheet of base material, such as credit-type cards and the like. The reader employs a head having a plurality of movable fingers disposed to sense the holes or embossing when the card is moved relative to the head. The fingers carry light guides thereon which are spaced from and disposed to transmit light from a fixed source. A light cut-off shield is disposed between the source of the light and the light guides to intercept and prevent or permit transmission of the light when the fingers pass over the embossed indicia or holes. Light detectors are disposed at the opposite terminus of the light guides to detect the presence or absence of light and produce electrical pulses corresponding thereto. These electrical pulses can be used or processed in any circuitry as information input correlating to the indicia on the base material, e.g., as input for numerical or letter display, as input for counting, as input for correlation with other input or stored information, and the like. The device also employs a special card guiding mechanism, including special search finger for one-at-a-time sequential feeding of credit cards into proper position to be read by the reader fingers. The device and method are particularly useful for reading of credit-type cards at remote retail installations, for reading of credit-type cards in verifier inserter systems, and for reading of Braille, or punched tape or cards.

13 Claims, 11 Drawing Figures

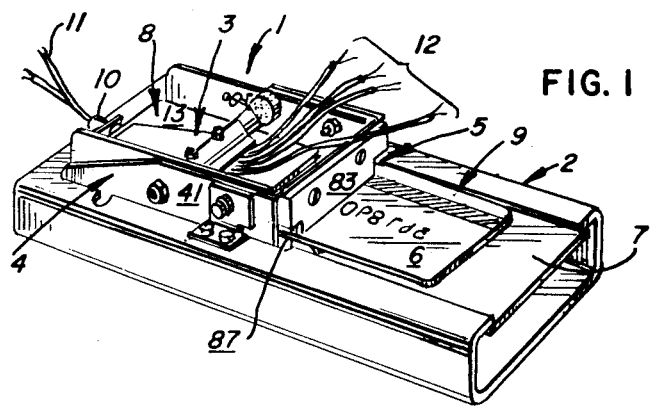

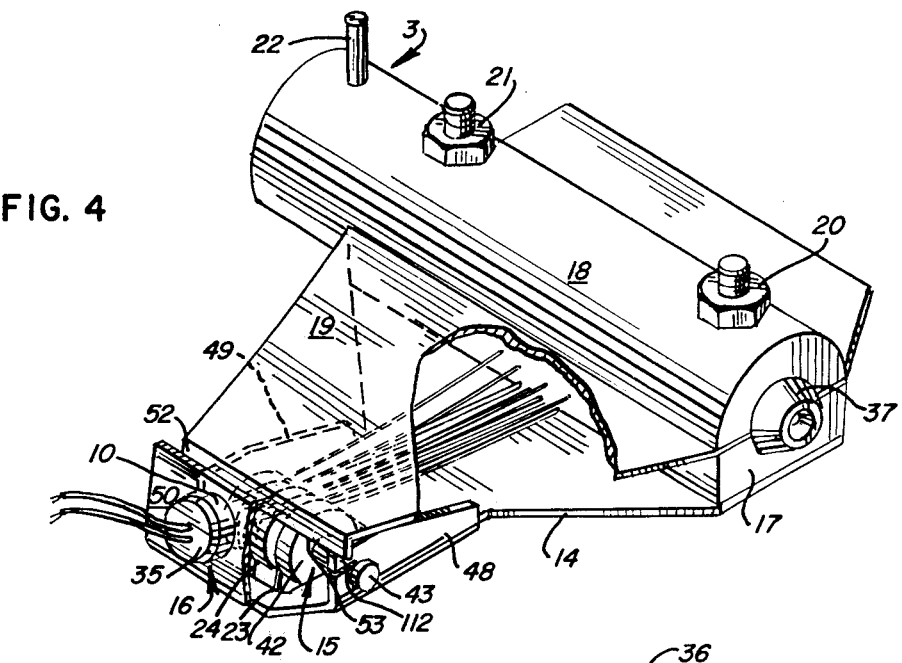
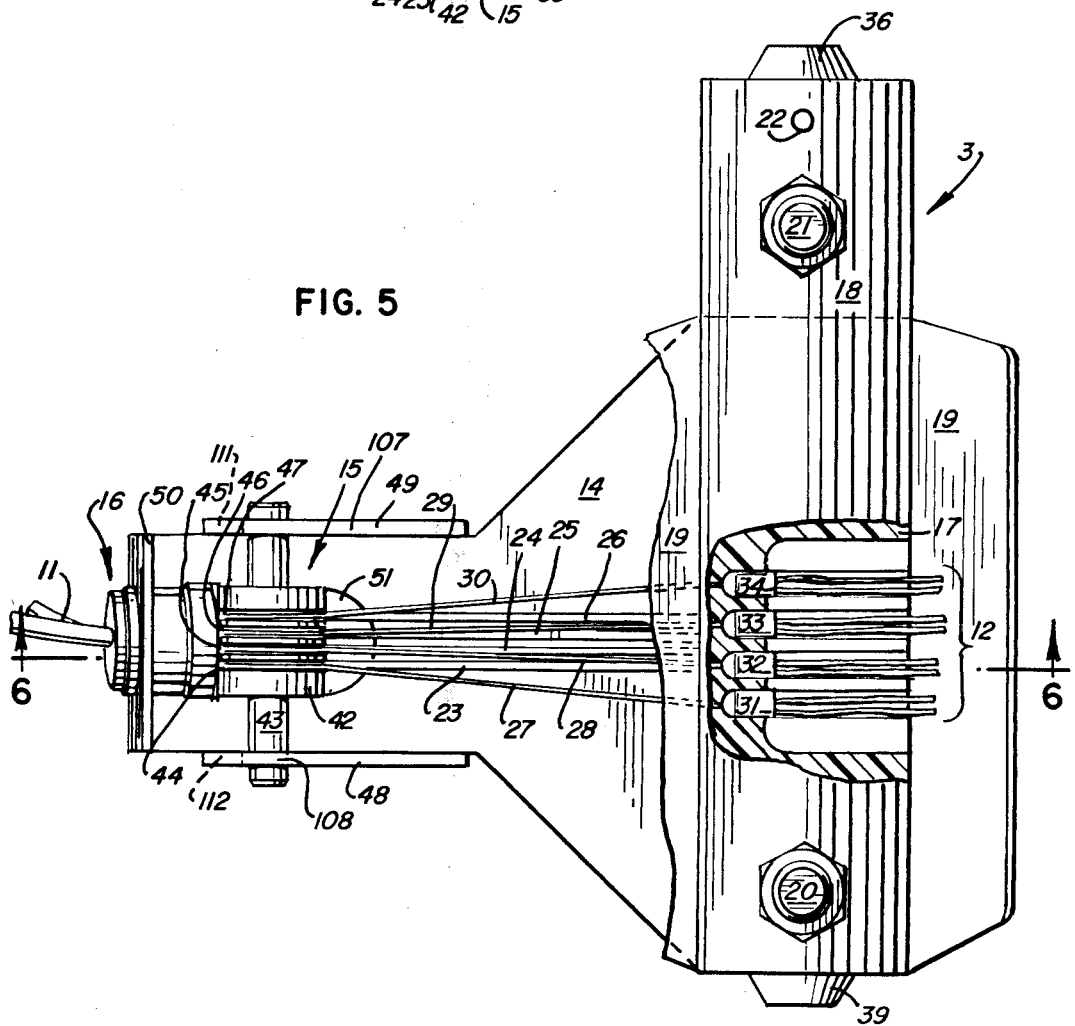

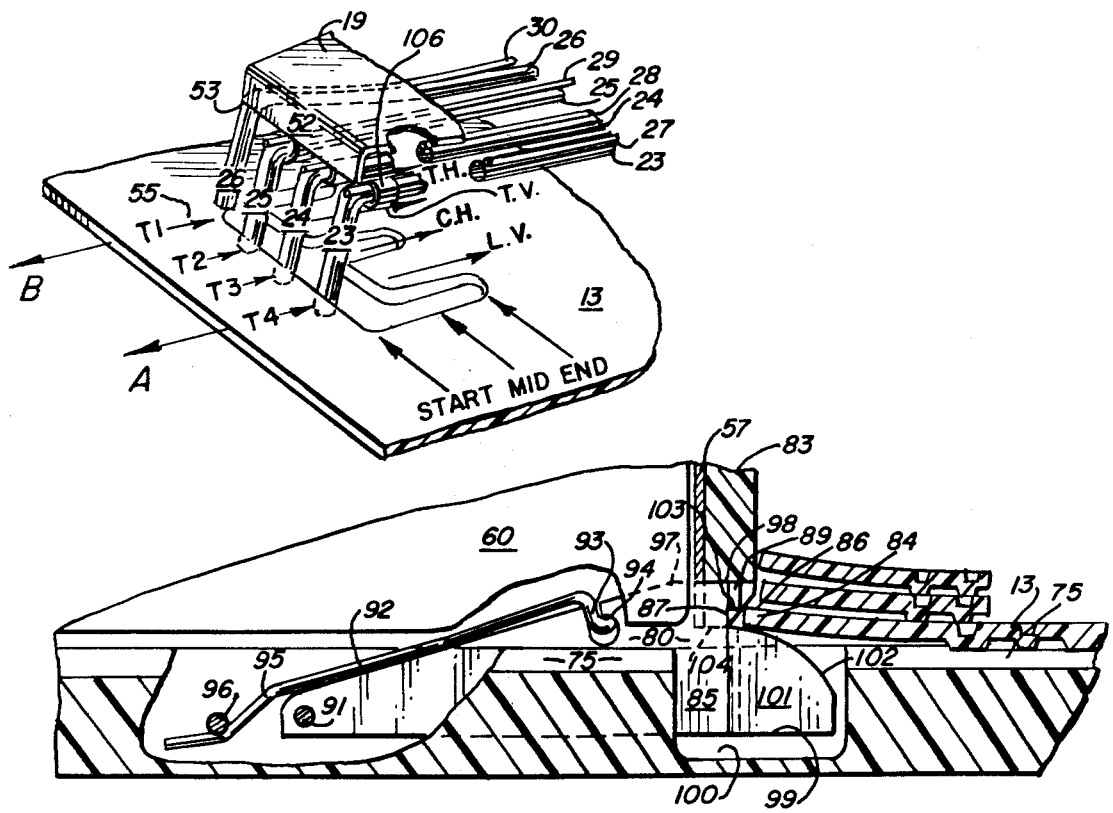
FIG. 9
FIG. 10
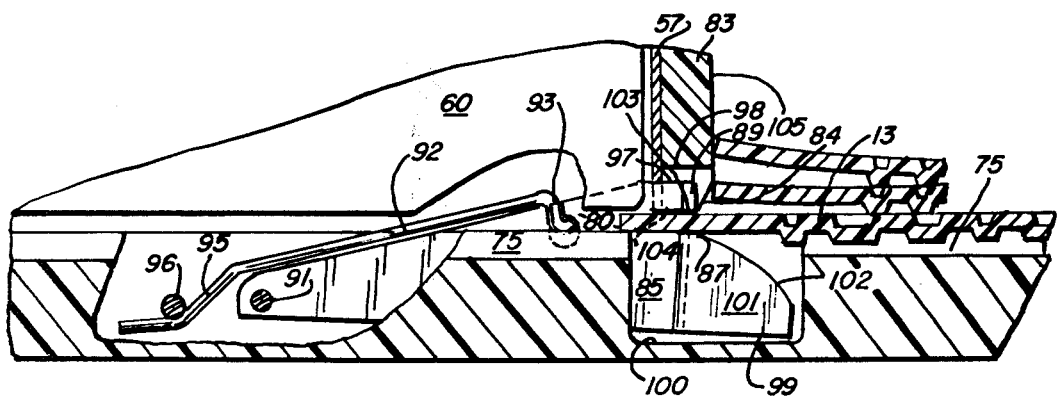
FIG. 11

EMBOSSED CHARACTER READER

This is a division, of application Ser. No. 723,215 filed Sept. 14, 1976 for Embossed Character Reader, now U.S. Pat. No. 4,119,270.

FIELD

This invention relates to devices and methods of mechanically sensing and reading information disposed on sheet material, and more particularly to reading characters embossed on credit-type cards, debit cards, account cards, key cards, pass cards, and the like. The invention is particularly concerned with a feed unit for sequentially selecting and feeding credit-type cards into proper alignment with special mechanical fingers which sense raised areas, depressions or holes in the cards, and transform them into electrical pulses by an optical detector system.

BACKGROUND

In the United States there were about 500 million credit cards in circulation in 1974, and an additional 200 million were issued that year on new accounts or to cover maintenance of accounts (renewal). These numbers do not include the emerging debit card field (for bank or for savings and loan account access), nor the ID and security card fields.

With the advent of such large numbers of cards, there has been perceived a need for remote location verification of credit or information carried by such cards to insure that the use of the cards is proper. For example, it is important to check the current status of an account at the time the card is presented for use at a retail merchant. The present system involves the use of lists of bad accounts which are checked by the store clerk. Also, where purchases exceed a specified amount, an authorization code must be first obtained by telephoning a central authorization bureau.

There is a need for accurate mechanical reading of the credit cards and transmittal by electronic means of the information to such centers for checking and entry of the amount of purchase. This is one step in the trend toward electronic transfer of funds, credit and information carried on and by such cards.

There is also a need for the mechanical reading of information from security and ID cards to permit access to various places, such as homes, places of business, factories, and the like.

There is also a need for verification of the correct information on credit cards, debit cards, account cards, ID and security cards at the time of their manufacture and just prior to their being forwarded on to the account or card holder for use. It is extremely important to insure that the card holder receives the correct card as well as the correct number of cards. This is particularly the case for ID or security cards where if the wrong person receives the wrong card, he could then gain access to valuable information or goods. Similarly, this is extremely important in the area of account cards wherein possession of a card gives access to the personal account. If the wrong account card is mailed to the wrong person, then that person may have unauthorized access to several thousands of dollars of funds of the person. At present, there is no automatic system for insuring that the information on credit cards is read and checked just prior to mailing. There is a need to determine the account information on the card and compare that with the address on the credit card carrier or envelope to insure that the card, and the right number of cards, are being mailed to the proper person. There is also a need at this time to verify that the account is a good account and that the card is not being mailed to a bad account.

There is also a need for a Braille or hollerith-type punch reader that can mechanically scan information of such type on sheet material and transform it into optical and/or electronic form for further processing.

THE INVENTION

Objects

Accordingly, it is an object of this invention to provide a device and method for reading information contained on sheet material.

It is an object of this invention to provide a device and method for reading embossed, impressed or punched holes in sheet material, and particularly in credit cards, account cards, ID cards, and the like.

It is an object of this invention to provide a device and method for mechanically sensing information contained on sheet material by relative motion between the sheet material and sensing fingers.

It is an object of this invention to provide a device and method of translating mechanical motion to electrical pulses, which electrical pulses serve as information inputs for any desired type of electrical, electronic, electromechanical or optical circuitry.

It is an object of this invention to provide an optical link between mechanical sensing of information on sheet material and electrical output pulses which serve as information inputs to other circuits.

It is an object of this invention to provide a device and method of sequentially feeding a plurality of sheets of material in a manner which disposes the information embossed, impressed or punched therein in proper alignment for mechanical sensing.

It is an object of this invention to provide a device and method of searching for leading edges of sheet material and automatically aligning them with entry slots permitting sequential feeding for subsequent processing.

It is an object of this invention to provide a mechanical device and method for reading information from credit-type cards, Braille or punched sheet material and for translating the information into optical and/or electrical outputs.

Still other and further objects will be evident from the description which follows.

THE FIGURES

FIG. 1 is a perspective view of the reader and feed tray with a card being read, and a second card in position to be fed through the entry slot into contact with the read head;

FIG. 2 is a plan view of the feed tray, read head and card;

FIG. 3 is a side view, partly in section, of the assembly shown in FIG. 2;

FIG. 4 is a perspective view of the read head alone with a portion broken away to illustrate the spring-biased fingers and optical guides;

FIG. 5 is a plan view of the head with portions broken away to show the fingers and detector elements;

FIG. 9 is an enlarged perspective of the read fingers at the start of reading a number and shows four read tracking paths;

FIG. 10 is an enlarged side view, partly in section, showing the construction and operation of the search fingers and entry slot in the card feed tray mechanism in a first, initial position; and FIG. 11 is an enlarged side view, partly in section, showing the search fingers of FIG. 10 in a second position with a card advanced through the entry slot.

SUMMARY

Figure 6:
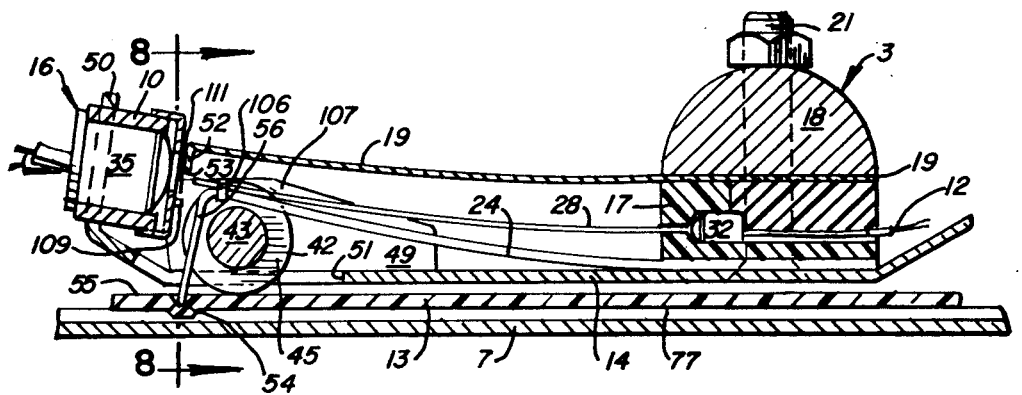
FIG. 6 is a side section view of the head in the process of reading a card taken through line 6—6 of FIG. 2.
Figure 7:
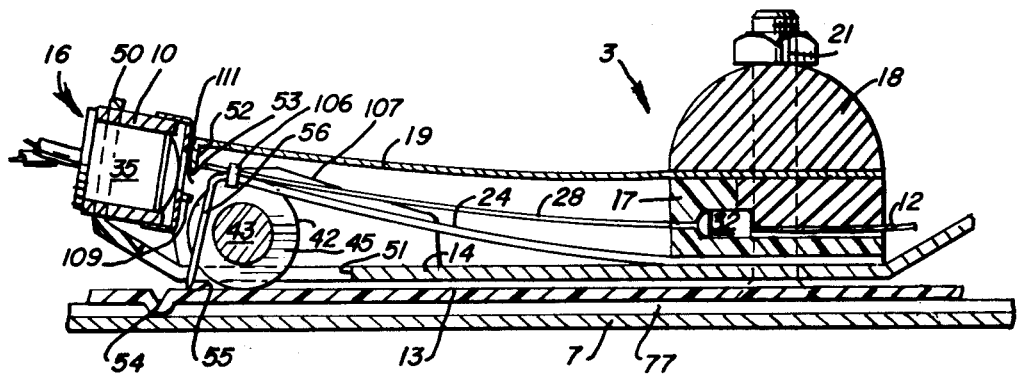
FIG. 7 is a side section view of the head of FIG. 6 with the card in a more advanced position.

The invention comprises a device and method for reading information disposed on sheet material, particularly credit-type cards. More specifically, the invention is directed to reading information embossed, impressed, or punched (as holes) in sheet material, such as credit cards, Braille or Hollerith punches, by the use of sensing fingers and an optical linkage to electro-optical detectors which provide output in electrical pulse form for any desired use.

The system of the invention comprises a feed tray for sequentially feeding credit cards into proper alignment with a read head which senses the embossed characters on the credit cards and translates them into electrical output pulses. The tray is characterized by having a feed assembly which employs spring-biased search fingers which align the card leading edge with a feed slot to permit sequential, one-at-a-time feeding of proper-sized credit cards into association with the sensor head of a read station. Each subsequent card may contact and push the card ahead of it through the read station.

The read or sensor head comprises a plurality of read fingers which are spring biased to contact the embossing or punched holes of the sheet material being read. As the sheet material (credit card) is moved relative to the read fingers, the read fingers follow the depressions or apertures and reciprocate vertically. Attached to each finger is an optical guide, preferably a light pipe. Disposed spaced from, but axially aligned with the light pipe is a light source. A cutoff shield is disposed intermediate the light pipe and the light so that upon reciprocation of the fingers, the light transmitted to the light pipes is cut off or revealed depending on the vertical position of the finger with respect to the embossing or aperture of the card.

The light signals can be used directly as information outputs correlating to the embossing or apertures in the surface of the material that was read by the read head sensor fingers. We prefer to use the optical information indirectly as input to detectors adapted to translate the light signals into electrical pulses. In this embodiment, a light detector is disposed at the other end of the light pipe. The optical detector senses the presence or absence of light and emits an electrical pulse in response thereto. These electrical pulses provide the inputs for any desired type of circuitry, e.g., for the purpose of visual display or incorporation as input information into a type of transmission or verification circuitry.

The embossed character reader of this invention is particularly useful in conjunction with a verifier and inserter system of processing credit cards prior to being mailed to card holders. This system is more particularly shown and disclosed in our co-pending application, Ser. No. 615,112, filed Sept. 19, 1975, and entitled CREDIT CARD CARRIERS, APPARATUS AND METHODS, now U.S. Pat. No. 4,034,210.

The light or electrical outputs can be used to trigger other output producing devices. For example, in reading Braille by the read head, the outputs can be transformed into discrete tones so that individual letters or numbers correspond to individual tones or chords. The outputs may actuate a speech synthesizer to permit translation of Braille books to recognizable speech.

The sensing of apertures is particularly useful in Jacquard-type weaving apparatus where warp and weft instructions are carried on punched cards. The read head of this invention can translate that information into optical and/or electrical outputs to actuate the appropriate heddle (e.g., solenoid actuated heddles) or the shuttles.

DETAILED DESCRIPTION

The following detailed description is by way of illustration and not by way of limitation of the principles of the instant invention. The detailed description which follows has particular reference to credit cards, and reading the embossed numbers or letters thereon, but it should be understood that the principles of this invention may be applicable to any type of sheet material whether the information to be read therefrom is embossed, impressed, built up thereon, etched therein, or punched therethrough. The invention is particularly applicable to the reading of credit cards, but is not to be limited thereto. For the sake of simplicity, it should be understood that reference to a credit card includes by way of example and not by way of limitation: credit cards, bank cards, debit cards, retail cards, identification cards, account cards, security cards, pass cards, key cards, ID cards, charge cards, and the like. The invention is also particularly applicable to the reading of Braille, Hollerith punches, embossed Morse code, and the like in any sheet material or on any surface. It should also be understood that while reference is made to the credit card being moved through the read or sensor station, it should be understood that any relative motion of the fingers with respect to the information desired to be read is contemplated. Thus, motion is understood to be relative movement of the sheet material containing the information with respect to the fingers of the read head.

It should also be understood that while four fingers or sensor tracks are employed, any number of tracks may be used. It should also be understood that the tracks may be disposed side by side as in the embodiments particularly shown in the figures, or may be disposed ahead or behind each other in one or more rows.

Embossed character reader assembly 1 comprises a feed tray unit 2, a sensor or read head unit 3, and a frame unit 4 on which the read head 3 and search finger assembly 5 is mounted. Credit-type card 6 is disposed in slideway 7 and advanced (from right to left in FIG. 1) through the search finger assembly 5 into the read station 8. Each subsequent card may be used to push the card ahead of it through the read station position. The cards may be mechanically or manually advanced from the card load area 9 through the read station 8, and out the left end of the unit as shown in FIG. 1. It is important to note the reading of the cards is not rate dependent. That is, the reader of this invention does not depend upon timed advancement of the card relative to the read head sensor fingers. Accordingly, manual advancement of the card, with its attendant variations in card advance speed, does not cause inaccuracies in reading information from the card.

Current for the lamp in lamp holder 10 is provided through wires 11. Output electrical pulses from the detectors in the read head are transmitted through the wire pairs 12 exiting from the rear of the sensor head. For the sake of clarity, these wires are omitted from FIGS. 2, 3, 4 and 8, but it should be understood that they are present in those embodiments requiring an electrical pulse output. Where a purely optical output is desired, the wire pairs 12 may be substituted by fiber optic or light pipe conduits to the appropriate light receptor or display devices to be employed (not shown). It should also be understood that while movement of the cards past the fixed read head is shown in the Figures, it is not necessary to move the sheet material. Rather, the read head may be mounted on one or more slides permitting motion of the head relative to a fixed surface containing the embossing or punches.

Still further, it should be noted that the Figures illustrate reading the depressions in the embossing. That is, the credit cards are read from the backside and not from the front side. However, this is not an absolute requirement, and the unit as shown is equally adaptable to read the raised portion of the embossing, that is, reading the front side of credit cards and the like. It should also be understood that while the embodiments illustrated show transmission of light when the fingers descend into the embossing impressions, and are cut off when the fingers ride across the flat surface of the card, the light, fingers, light pipe and mask assemblies can be adapted to permit the reverse, i.e., transmission of light when the fingers transverse a smooth surface and cut-off of the light transmission when the fingers sense a depression or hole. The present arrangement shown is preferred so that the light transmission is normally off, with light pulses (and accordingly electrical pulses) being transmitted when a depression or aperture is sensed rather than vice versa.

It should also be noted that the last number in a left-to-right array of numbers, for example a credit card account number, is read first. This, too, can be reversed to read the first number first by turning the credit card end for end or turning it over and reading the first number first. We prefer to read the last number first so the numbers will be stacked in sequential array in their correct order for lighted digital display.

FIGS. 2 and 3 show a plan view and a side view, respectively, of the embossed character reader assembly unit with a first card 13 in the read station 8 being read by the read head 3, and a second card 6 in the card load area 9 acting as the pusher for the first card along the slideway 7.

Refer now to FIGS. 4 through 8 for details of construction of the read head 3. The read head 3 comprises a spool carriage 14 having disposed thereon a spool assembly 15 and light assembly 16. The spool carriage 14 is mounted on the underside of a detector block 17. Mounted between the detector block 17 and a pivot block 18 is a mask or shield 19. The carriage, detector and pivot blocks and mask are secured by bolts 20 and 21. Arm 22 permits height adjustment of the sensor or read fingers with respect to the card to be read as described in more detail below. The read head also includes a plurality of sensor fingers 23, 24, 25, and 26, and corresponding light transmission guides 27, 28, 29, and 30, each mounted piggyback on its fingers with a sleeve 106 (see FIGS. 6 and 7). The fingers are conveniently 0.020" dia. spring wire. The light guides may be light pipes or optical fibers. The embodiments shown are 0.010" dia. light pipes. One end of the light pipes is free to receive light input from the light source assembly 16, while the other end (the right end in FIGS. 5 through 7) terminates adjacent photosensitive detectors 31, 32, 33, and 34. These detectors may be any suitable phototransistor, for example, an NPN planar silicon phototransistor such as produced by Texas Instruments, part TIL 612. The light source 35 is mounted within the lamp holder 10 and powered by line 11 to comprise the light source assembly 16. The light may be any suitable source of wavelength to activate the light detector. We prefer to use an infrared light source such as an infrared solid state lamp of a type typically known as a gallium arsenide infrared emitting diode. Suitable lamps may be a General Electric FSL 35 or LED 55C. Output wires 12 may be directed to the input side of any electrical or electronic assembly requiring the information input from the cards.

Each end of the pivot block 18 is adapted with bearing surfaces 36, 37 which receivingly engage corresponding needle bearing assemblies 38, 39 (FIGS. 2 and 8) which are mounted in the side walls 40 and 41 of the frame 4.

The spool assembly 15 comprises an annular spool 42 mounted on a shaft 43. The spool has a series of annular grooves 44, 45, 46, and 47, which slidably receive sensor fingers 23 through 26, respectively. The shaft 43 is received by upturned sides 48, 49 of the spool carriage 14 while the lamp holder 10 is mounted in upturned end wall 50 of the carriage. The carriage also is apertured at 51 to permit the spool and sensor fingers to extend therethrough into contact with the material being read.

As best seen in FIGS. 3 and 6–9, light from source 35 may impinge upon the open ends of the light pipes or optical fibers 27–30 depending on their relative position with regard to the depending lip 52 of the mask 19. The lower edge 53 of the lip rests on the top 107, 108 of carriage side walls 48, 49. The height of the lip may be adjusted by means of slots 109 and 110 in the carriage side walls 48, 49. The tab portions 111 and 112 are malleable, and by inserting a wedge-type tool, e.g., a screwdriver, the tabs may be raised, thereby adjusting the edge 53 relative to the light axis. Likewise, the slots can be closed by pliers or other compression of the tab. Accordingly, the edge 53 of the lip is adjusted respective to the axis of the light pipe or optical fibers and the light source so that when the fingers drop down into an embossed area 54 (or hole) of card 13 (see FIGS. 6–9), light is transmitted down light guide 28 to the detector 32. Correspondingly, when the card is advanced relative to the read head finger 24 so that the finger rises up out of the embossing and is traveling on the surface of the card 55, the lower edge of the lip 53 cuts off transmission of the light because the actual position of the light guide has moved relative to the fixed lip position.

In another embodiment, the light guides need not be carried by the fingers. Rather, the guides may be fixed, and individual masks attached to the depending portion 56 of the finger 24 so that the masks intercept the light from the light source 35.

Turning back to FIGS. 2 and 3, the read assembly 3 can be seen as mounted on the frame 4 in relation to the slideway 7. The frame 4 comprises side walls 40 and 41, and end wall 57. The frame may be secured to the feed tray unit 2 by means of brackets 58 and 59. Card hold-down guide 60 is spaced inwardly from wall 40 while guide 61 is likewise spaced from wall 41. The spacing may be accomplished by bolt assemblies 62, 63, 64 and 65 employing spacers 66, 67, 68 and 69, respectively.

The height of the spool and fingers is adjusted by means of stop screw assembly 70 biasing lever arm 22 against a resilient block 71 (see FIGS. 2 and 3). The stop screw assembly and resilient block are secured to the side wall 40 by screws 72 and 73, respectively. By advancing the stop screw 74 (turning it clockwise), the fingers may be raised as the screw biases the arm 22 backwards into the resilient block 71. The resilient block also permits absorption of shocks and bounce when the spool and fingers pass over the leading or trailing edges of a card.

Figure 8:
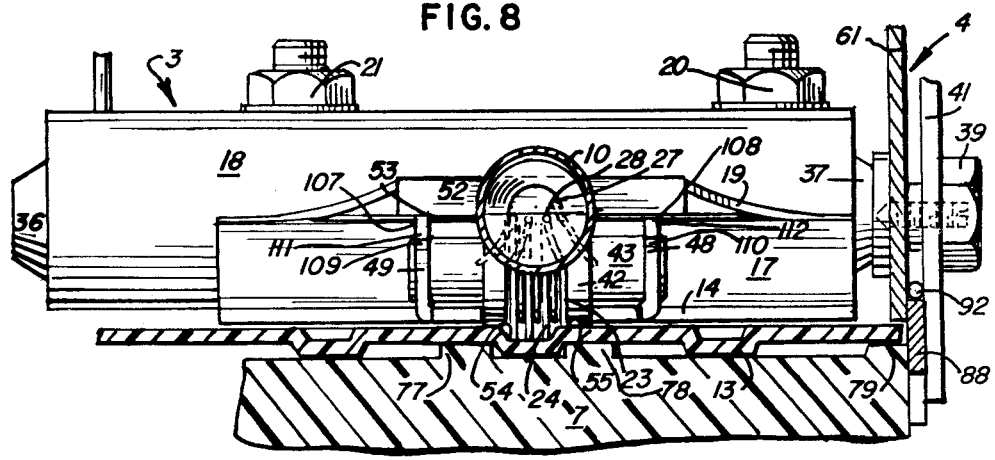
FIG. 8 is a front view, partly in section, through line 8—8 of FIG. 6.

The card is supported in slideway 7 at its edges and along the center by ridges, 75, 76, 77, 78, and 79 (see FIGS. 2, 8, 10 and 11). As best seen in FIGS. 8, 10 and 11, the card hold-down guides 60 and 61 are spaced upwardly from the respective edge slideway ridges 75 and 79 so as to provide free movement of the card 13 therethrough without permitting substantial upward flexing of the card. The mid-card ridges 76, 77 and 78 (see FIGS. 2 and 8) provide support on either side of embossed areas 54 so that downward pressure of the spool and fingers does not cause flexing of the card, resulting in misreading of the embossings or apertures therein.

Normally in card embossing processing, the embossings are placed on the card with reference to the bottom edge of the card, while magnetic stripes are referenced to the top of the card. Nevertheless, the position of the embossing may not be properly referenced, or may be misaligned within industry accepted standards. It is accordingly an important aspect of this invention that the cards are guided through the read station by the embossing, rather than by card edges. This self-referencing feature is accomplished by the mid ridges 76, 77 and 78. As best seen in FIG. 8, the ridges 77 and 78 are spaced laterally apart just enough to slidably receive the embossed indicia that are to be read. The side walls 40 and 41 are spaced apart wider than the width of the card 13 to permit sufficient lateral movement of the card so that embossings that are misaligned on the card can find and be guided along the one or more guideways defined between mid ridges 76, 77 and 78.

Continuing with FIGS. 3, 10 and 11, the endwall 57 of the frame 4 is spaced upwardly from the slideway ridges 75 through 79 to provide a slot 80 which permits passage of the card therethrough. Attached to the endwall 57 by means of bolts 81 and 82 is a card lead-in block 83. The lead-in block has a beveled or chamfered lower leading edge 84 which causes cards being advanced into the card entry slot 80 to be pushed downwardly toward the slot as they advance (from right to left in FIGS. 3, 10 and 11).

As noted best in FIGS. 3, 10 and 11, credit cards after embossing are normally slightly bowed, concave as viewed from the back side, as a result of the embossing processing. As shown in those figures, normally a stack of cards is placed on the card load area 9 and the bottom-most card advanced into the slot. Accordingly, because of the curvature of the cards and the fact that cards are stacked one above the other, a simple feed-in aperture is not adequate for continuous, end-to-end feeding of cards.

This invention includes specially adapted search fingers which cooperate with the card lead-in block and slot for guiding the cards one at a time through the slot and preventing the jamming of cards stacked above the card being fed. This is best shown in FIGS. 10 and 11.

FIG. 10 illustrates in side view the cooperative action of search finger 85 with the beveled edge 84 of the lead-in block 83 to find and guide the leading edge 86 of the bowed card 13 through the slot 87 in search finger 85 and thence into the slot 80 formed between the slideway ridges 75–79 and end wall 57. By reference to FIG. 2, it can be seen that search finger 85 is one of two search fingers disposed on either side of the ECR assembly. The two search fingers 85 and 88 need not be coupled, but can act independently, as shown. As can be seen best in FIG. 2, finger 85 is mounted between side wall 40 and card hold-down guide plate 60, while finger 88 is disposed between wall 41 and guide plate 61.

The forward end of the fingers are bent inwardly from the side edges of the slideway to form stop plate portions 89 and 90 (see also FIGS. 10 and 11). These stop plate portions of the fingers prevent cards lying above card 13 from attempting to move through the slot 87 in finger 85 and thence through slot 80. Front face 105 of block 83 prevents those cards from moving forward when the finger is in the lower position shown in FIG. 11. Finger 85 is free to move vertically in the space between side wall 40 and guide plate 61. The finger is pivoted around shaft 91 disposed at the rearward end of the finger, as best seen in FIGS. 10 and 11. The finger is also spring-biased in an upward direction by the action of spring 92. The forward end of the spring is formed into a depending hook 93 which engages shoulder 94. The rear end of the spring is bent at 95 to engage pin 9. As best seen in FIG. 10, the spring is medially bowed so that it biases the finger in an upward position. The upward edge 97 of the finger engages shoulder 98 in the card lead-in block, limiting its upward movement (FIG. 10). The bottom edge 99 of the finger may engage the bottom of recess 100 (FIG. 11) thus limiting the downward travel of the finger.

The search finger is adapted with a projecting tang 101 having an upper edge 102 which is curved or tapered toward slot 87. The operation of the search fingers can best be seen by comparing FIGS. 10 and 11 in which a card advances through slot 87 in slot 80. In FIG. 10, the leading edge 86 of the card contacts the curved edge 102 of the finger tang 101 and is guided toward the slanting surface 84 of the lead-in block 83. When the card edge 86 contacts the block edge 84, it is then guided downwardly toward the slot 87. At the same time it depresses the finger until the bottom edge 103 of the stop plate 89 is aligned with the bottom edge 104 of the lead-in block 83. The card can then enter slot 87 and slide through slot 80 as best seen in FIG. 11. In the process, the card becomes unbowed and is maintained relatively flat as it travels through the read station.

FIG. 9 is an enlarged detail showing the displacement of four sensor fingers as a card is moved from right to left in reading the number three (as shown by arrows A and B in the Figure). Finger 23 still rests on the back surface of the card 55 while fingers 24, 25, and 26 have already proceeded into the embossing. Thus, at the start of a read cycle, light pipe 27 is raised up behind the depending lip 52 of the mask so that edge 53 of the lip cuts off the transmission of light therethrough. Light guides 28 through 30, being attached to fingers 24 through 26, respectively, follow the fingers downwardly into the embossing. These light guides are still exposed to the light source and accordingly transmit light to their respective light detectors, 32-34.

As shown in FIG. 9, we prefer to employ only four tracks in reading the numbers or letters. We may read from left to right, right to left, top to bottom, or bottom to top in any number of tracks. FIG. 9 illustrates reading 7B type font, which is a typical standard font used for credit cards. Typically, the embossing has a front side depth of about 0.013-0.018". We have found that we can read such font with only four tracks illustrated in FIG. 9 as: T-1, top horizontal; T-2, top vertical; T-3, center horizontal; and T-4, lower vertical. We have found that we can read numbers relying only on five of the seven segments making up the numbers 0 through 9. These segments are: a top horizontal segment "a"; the left upper vertical side segment "f"; the right upper vertical segment "b"; the center horizontal segment "g"; the left lower vertical segment "e"; the right lower vertical segment "c"; and the bottom segment "d". We have found that the "c" and "d" segments are superfluous in the process of reading 7B font numerals in accordance with this invention. Other fonts may require reading all segments, or omitting one or more of the segments.

For example, in reading the number three shown in FIG. 9, we have the following sampling states in each of four tracks at the start, middle and end of the read cycle:

| Track Number | Between Characters (Before) | Start | Mid | End | Between Characters (After) |
|---|---|---|---|---|---|
| 1 | Off | Off | On | On | Off |
| 2 | Off | On | Off | Off | Off |
| 3 | Off | On | On | On | Off |
| 4 | Off | On | Off | Off | Off |

Accordingly, it can be seen that in the process of reading in accordance with the present invention, there is a total recognition state between characters and transition at the beginning of a character. In addition, each finger has a transition and change of state. The transition from On to Off or vice versa is optical information that the finger is in a position at which it can commence to sample the first vertical element, whether it is upper or lower left or right. We also can sample at the mid-point of the character along the horizontal top and center element. This is evidenced by continuation of an On state in tracks 1 and 3. The mid-point is identified by the fact that as compared to tracks 2 and 4 which will have gone through either two or no transitions, tracks 1 and 3 will have gone through one transition from Off to On. We also sample at the end of the character for the last vertical, the upper right.

In accordance with this invention, the instant the fingers sense a vertical in channel 2 or 4, this pulse can be counted with a digital counter. When the 2 or 4 channels go to an Off or dark state, the count may be reversed, and channels 1 and 3 can be sampled at the mid-point of the number or letter. The third sample occurs the next time the fingers 2 or 4 goes through a transition, e.g., passes into an embossing. The end occurs when all fingers rise back up to the card surface level, and the optics are cut off. This permits speed-independent reading which is particularly useful for credit validation, such as where the embossed character reader of this invention is used as an in-store terminal hooked directly to a computer which searches a "black-and-white" list.

The grooves 44 and 46 in the spool 42 are wider than the grooves 45 and 47. This permits fingers 23 and 25 slight lateral movement so that they can search laterally for the top and center horizontal bars of the indicia in tracks 1 and 3. The numbers 1, 3, and 7 have no vertical element in track 2 at the start. Reading all characters backwards permits a vertical segment to cause a transition in track 2 or 4, thus signalling the start of the read cycle, and permitting determination of plural sampling points across the indicia as it is read.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. Apparatus for locating and permitting sequential passage of individual objects of a preselected size comprising in operative combination:
   (a) a first station for receiving a plurality of said objects;
   (b) a guide surface for passing individual ones of said objects therealong;
   (c) means defining at least one aperture permitting passage therethrough of preselected size and properly aligned objects;
   (d) means for locating an edge of said object and guiding said edge to said aperture including:
      (i) spring-biased fingers having a leading edge for guiding one of said objects toward said aperture, and
      (ii) first stop means disposed on said fingers to prevent advancement of a second of said objects toward said aperture as said first object is passed therethrough.

2. Apparatus as in claim 1 wherein said aperture means includes:
   (a) second stop means having a surface for guiding said objects toward said aperture.

3. Apparatus as in claim 2 in which:
   (a) said leading edge of said locating means terminates spaced from said first stop means to define a slot therebetween adapted to pass said object,
   (b) said second stop means is disposed spaced from said guide means to define said aperture therebetween, and
   (c) said slot in said locating means fingers is adapted to align with said aperture defined between said guide and said second stop means.

4. Apparatus as in claim 3 wherein said objects are credit-type cards.

5. Apparatus as in claim 4 which includes:
   (a) a second station disposed spaced downstream, relative to the direction of travel of said credit card objects, from said aperture and edge locating means,
   (b) said guide surface extends past said second station;
   (c) an embossed character read head disposed in said second station having surface sensing means for reading the surface contour variations from said credit cards as they pass through said second station along said guide surface.

6. Apparatus as in claim 5 which includes:

(a) means for guiding said surface along a predetermined path relative to said surface sensing means whereby predetermined portions of said surface contour variations are contacted by said surface sensing means.

7. Apparatus as in claim 6 wherein said guide means includes:
(a) means for referencing said surface contour portion to said surface sensing means.

8. Apparatus as in claim 7 wherein:
(a) said surface contours include a plurality of embossings, disposed in a predetermined path and having a lateral edge thereto, and
(b) said referencing means includes at least one shoulder disposed to contact said embossings lateral edge thereby guiding said embossings into contact with said surface sensing means.

9. Method of reading arabic and numeric characters having a plurality of character segments comprising:
(a) scanning said characters backwards along only four discrete paths by movement of said characters relative to a plurality of segment sensors at least one of each sensors being disposed in each of said paths;
(b) said paths being defined:
  (1) as a first track T1 defined across a top horizontal portion of said character;
  (2) as a second track T2 defined across a top vertical portion of said character;
  (3) as a third track T3 defined across a center horizontal portion of said character; and
  (4) as a fourth track T4 defined across a lower vertical portion of said character;
(c) the scanning of said character segments being substantially independent of:
  (i) the rate of said movement, and
  (ii) timed advancement of segments relative to said sensors;
(d) initiating the start of a character read cycle upon sensor state transition from a common recognition state in vertical segment Tracks 2 or 4,
  (i) said transition defining the initiation of a first sensor state sampling point at the beginning of a character,
  (ii) terminating said first sensor state sampling point upon both said sensors of Tracks 2 and 4 being in a common recognition state, thereby
  (iii) permitting determination of possible plural additional sample points across the character during the read cycle;
(e) sampling said sensor states in horizontal segment Tracks 1 and 3 at at least one point across the width between vertical character segments of said character as a second sampling point;
(f) sampling said sensor states at a third point in vertical segment Tracks 2 or 4 at the end of said character as determined relative to said first sample point,
  (i) said third sample point being initiated by a transition in either of Tracks 2 or 4,
  (ii) said third sample point terminating upon both sensors of Tracks 2 and 4 being in a common recognition state;
(g) terminating said character read cycle upon all four track sensors being in a common recognition state; and
(h) comparing the sensor recognition states of the character samples to uniquely identify said character as determinative of reading said character.

10. Method of reading characters as in claim 9 wherein three sensor state sample points are employed per character.

11. Method of reading characters as in claim 10 wherein said characters are embossed characters.

12. Method of reading characters as in claim 11 wherein said embossed characters are embossed in a credit-type card and the back side depressions are mechanically scanned.

13. Method of reading characters as in claim 9 or 12 wherein the last number of a series of numbers is read first so that said numbers are stacked in sequential array for processing or display.

* * * * *